United States Patent Office 3,013,085
Patented Dec. 12, 1961

3,013,085
METHOD OF PREPARING TETRAKIS (1-HYDROXYALKYL) PHOSPHONIUM SALTS
Sheldon A. Buckler, Stamford, Conn., assignor to American Cyanamid Company, New York, N.Y., a corporation of Maine
No Drawing. Filed Apr. 1, 1959, Ser. No. 803,373
8 Claims. (Cl. 260—606.5)

The present invention relates to organophosphorus salts and to the preparation thereof. More particularly, the instant discovery concerns the preparation of tetrakis-(1-hydroxyalkyl)phosphonium salts of the formula $$(RCHOH)_4 \overset{\oplus}{P} \cdot \overset{\ominus}{X}$$

wherein X represents the anion of a mineral acid and R is a saturated straight-chain alkyl group having 1 to 18 carbon atoms.

Compounds of this class were prepared in the 19th century by J. Messinger et C. Engels, Ber., 21, 326 (1888) by reacting $pH_3$ with normal alkyl aldehydes in the presence of a nonaqueous ether solvent using dry HCl as a catalyst. Unfortunately, this process gives poor yields of the desired product and good yields of undesirable by-products from which the phosphonium salts are difficultly separable.

According to the present invention, however, very desirable yields of relatively pure product are achieved by establishing a solution of a mineral acid, an inert organic solvent and water, admixing therewith phosphine and an aldehyde of the formula RCHO, wherein R is the same as above, the phosphine reactant being present throughout the reaction in at least stoichiometric amount with respect to the aldehyde reactant, and recovering the resulting tetrakis(1-hydroxyalkyl)phosphonium salt.

Among the many inert organic solvents contemplated herein are lower aliphatic monohydric alcohols, such as ethanol, butanol, and the like, tetrahydrofuran, dioxane, 1,2-dimethoxyethane, and the like. Usually, the organic solvent constitutes 30–60 percent by volume of the acid-water-solvent solution. However, as much as 95 percent and as little as 5 percent by volume are contemplated herein.

Preferably, the reaction contemplated herein is carried out at a temperature in the range of 15° C. to 60° C.; however, it may be made to take place throughout the broader temperature range of about 0° C. to about 100° C. with satisfactory results.

Among the mineral acids best suited for the present invention are HCl, HBr, HI, $H_2SO_4$, $H_3PO_4$, $HNO_3$, and the like.

The reaction contemplated herein may be carried out at atmospheric, sub-atmospheric or super-atmospheric pressure, and, furthermore, it may be continuous, semi-continuous or batch.

While considerable range is permissible in the ratio of reactants, phosphine to aldehyde, a suitable ratio, generally, is found in the range of 1:4 to 10:1, the ratio of about 1:4 being preferred. Likewise, a preferred molar ratio of HX to aldehyde is found in the range of about 1:2 to about 2:1, but a considerably lower range on the order of 1:4 to 10:1 is suitable.

Best results are obtained, according to the instant discovery, by maintaining substantially stoichiometric amounts of the phosphine and aldehyde reactants, or an excess of phosphine, in the reaction mixture throughout the reaction. It is important to avoid the presence of greater than about a stoichiometric quantity of aldehyde, basis the phosphine reactant, throughout the reaction. It has been found that an excess of aldehyde occasions side reactions and other complications resulting in substantially decreased product yields.

The present discovery will best be understood by reference to the following illustrative examples. The limitations contained in these examples are not to be considered as restrictions upon the scope of the invention, since it will be obvious to one skilled in the art that numerous modifications within the purview of the invention are possible and, by the same token, are contemplated herein.

EXAMPLE I

Preparation of tetrakis(1-hydroxyethyl)phosphonium chloride

A one-liter, three-necked reactor flask is equipped with a gas inlet tube, an addition funnel, a mechanical stirrer and a gas bubbler device so disposed that all exit gases from the flask pass upwardly therethrough, the bubbler device comprising a column containing a two-inch head of water. The reactor flask is charged with a solution mixture of 200 milliliters of tetrahydrofuran and 100 milliliters of a concentrated aqueous solution of hydrochloric acid containing 37.7 percent HCl by weight.

Subsequently, a 20-minute purge of the reactor flask system described above and the solution mixture with nitrogen gas is effected; then for a period of 15 minutes gaseous phosphine is fed into the solution mixture at the rate of 50 milliliters per minute while stirring the solution vigorously.

Next, while maintaining a temperature of 25° C.–35° C. and providing vigorous stirring, a solution containing 44 grams (1.0 mole) of acetaldehyde dissolved in 50 milliliters of water is added continuously in the course of three hours. During this addition gaseous phosphine is also continuously fed to the solution mixture at a rate to provide a relatively slow stream of bubbles escaping through the bubbler device described above, a total of 17.0 grams (0.5 mole) of phosphine being introduced into the solvent-acid mixture.

The resulting reaction mixture is evaporated under reduced pressure to give 59.5 grams (97 percent by weight of theory) of product tetrakis(1-hydroxyethyl)phosphonium chloride, melting point 109° C.–112° C. The trace amounts of impurities in this product are removed by washing it with cold acetonitrile to give white crystalline product material of melting point 115.0° C.–115.5° C.

EXAMPLE II

Preparation of tetrakis(1-hydroxyheptyl)phosphonium chloride

The one-liter reactor flask equipped as described in Example I, above, is charged with a solution mixture of 200 milliliters of tetrahydrofuran and 200 milliliters of a concentrated aqueous solution of hydrochloric acid containing 37.7 percent HCl by weight. As also described in Example I, above, the system is purged with nitrogen gas and then gaseous phosphine is admitted thereto at the rate of 50 milliliters per minute for 15 minutes.

Next, while stirring the solution mixture vigorously and maintaining a temperature of 25° C.–35° C., 161 grams (1.4 moles) of heptanal was continuously added in the course of 1.7 hours. During this addition gaseous phosphine is also introduced into the solution mixture at a rate to provide a relatively slow stream of bubbles escaping through the bubbler device, as described in Example I, above. The product is then collected by filtration and dried to give 184 grams (100 percent of theory) of tetrakis(1-hydroxyheptyl)phosphonium chloride, melting point 114° C.–118° C. Recrystallization from benzene gives the analytical sample, melting point 123° C.–124° C.

Analysis.—Calculated for $C_{28}H_{60}ClO_4P$: C, 63.79; H, 11.47; Cl, 6.73; P, 5.88. Found: C, 63.48; H, 11.38; Cl, 6.47; P, 5.67.

EXAMPLE III

Preparation of tetrakis(1-hydroxydodecyl)phosphonium chloride

The one-liter reactor flask equipped as described in Example I, above, is charged with a solution mixture of 250 milliliters of tetrahydrofuran and 200 milliliters of concentrated aqueous hydrochloric acid. From this point, the preparation is carried out as described in Example I, above, with the exception that 59 grams (0.32 mole) of dodecanal is substituted for the acetaldehyde. The addition of the aldehyde is carried out continuously in the course of one hour and a total of 3.4 grams (0.1 mole) of phosphine is used in the preparation. The product is collected by filtration and dried to give 64.5 grams (100 percent of theory) of tetrakis(1-hydroxydodecyl)phosphonium cloride, melting point 106° C.–107° C. An analytical sample is prepared by recrystallization from a mixture of equal volumes of benzene and ethyl acetate, melting point 109.0° C.–109.5° C.

Anaylsis.—Calculated for $C_{48}H_{100}ClO_4P$: C, 71.37; H, 12.48; Cl, 4.39; P, 3.84. Found: C, 71.12; H, 12.51; Cl, 4.49; P, 4.18.

EXAMPLE IV

Preparation of tetrakis(1-hydroxypropyl)phosphonium bromide

The method of Example I, above, is repeated with these exceptions: 58 grams (1.0 mole) of propanal is substituted for the acetaldehyde, 200 milliliters of ethyl alcohol is substituted for the tetrahydrofuran, and 100 milliliters of aqueous hydrobromic acid containing 40 percent HBr by weight is substituted for the hydrochloric acid. The product is tetrakis(1-hydroxypropyl)phosphonium bromide, melting point 105° C.–106° C.

EXAMPLE V

Preparation of tetrakis(1-hydroxyheptyl)phosphonium iodide

The procedure of Example II, above, is repeated using a solvent mixture of 400 milliliters of tetrahydrofuran and 125 milliliters of aqueous hydriodic acid containing 57 percent HI by weight. The product is tetrakis(1-hydroxyheptyl)phosphonium iodide, melting point 120° C.–121° C.

EXAMPLE VI

Preparation of tetrakis(1-hydroxydodecyl)phosphonium nitrate

The procedure of Example III, above, is repeated with the exception that 100 milliliters of an aqueous solution containing 10 percent by weight of nitric acid is substituted for the hydrochloric acid. The white solid product is tetrakis(1-hydroxydodecyl)phosphonium nitrate.

EXAMPLE VII

Preparation of tetrakis(1-hydroxyheptyl)phosphonium hydrogen sulfate

The procedure of Example II, above, is repeated with the exception that 200 milliliters of an aqueous solution containing 34.3 grams of sulfuric acid is substituted for the hydrochloric acid. The white solid product is tetrakis-(1-hydroxyheptyl)phosphonium hydrogen sulfate.

EXAMPLE VIII

Preparation of tetrakis(1-hydroxydodecyl)phosphonium dihydrogen phosphate

The procedure of Example III, above, is repeated with the exception that 100 milliliters of an aqueous solution containing 20 grams of phosphoric acid is substituted for the hydrochloric acid. The white solid product is tetrakis-(1-hydroxydodecyl)phosphonium dihydrogen phosphate.

The compounds produced as contemplated herein are useful as fungicides. For example *Sclerotinia fructigena* and *Stemphylium sarcinaeforme*, parasites of stone fruits and clover, respectively, are cultured on potato agar slants. Spores of each fungus are washed from the agar slants with distilled water, and are adjusted, respectively, to a concentration of approximately 50,000 spores per cubic centimeter of water.

For each fungus species, 0.25 cubic centimeter of spore suspension together with 3.75 cubic centimeters of a water mixture of the compound to be tested, such as tetrakis(1-hydroxyethyl)phosphonium chloride, tetrakis(1-hydroxyheptyl)phosphonium chloride, or the like, are added to separate 4 cubic centimeter vials.

The concentration of the test compound in water is varied beginning with a concentration of about 0.1 percent by weight in water for the first test, the concentration being diminished in predetermined increments in subsequent tests.

The vials are rotated to provide intimate contact of the compound and organism. After a 20-hour exposure period, the spores are removed from the vials and are examined microscopically to determine percent germination.

The compounds of the present invention show desirable fungicidal activity in these tests.

Clearly, the instant discovery encompasses numerous modifications within the skill of the art. Furthermore, while the present invention has been described in detail with respect to specific embodiments thereof, it is not intended that these details be construed as limitations upon the scope of the invention, except insofar as they appear in the appended claims.

I claim:

1. A process for producing a tetrakis(1-hydroxyalkyl)-phosphonium salt of the general formula

wherein X represents the anion of a mineral acid, and R is a saturated, straight-chain alkyl group having 1 to 18 carbon atoms, which comprises establishing a solution of a mineral acid, an inert organic solvent, and water, and admixing therewith phosphine and an aldehyde of the formula RCHO, wherein R is the same as above, the phosphine reactant being maintained in at least stoichiometric amount throughout the reaction, basis the aldehyde reactant, and recovering the resulting tetrakis(1-hydroxyalkyl)phosphonium salt.

2. The process of claim 1 wherein the reaction is carried out at a temperature in the range of 0° C.–100° C.

3. The process of claim 1 wherein the mineral acid is HCl.

4. The process of claim 1 wherein the mineral acid is HBr.

5. The process of claim 1 wherein the mineral acid is HI.

6. The process of claim 1 wherein the mineral acid is $H_2SO_4$.

7. The process of claim 1 wherein the mineral acid is $HNO_3$.

8. A process for producing a tetrakis(1-hydroxyalkyl)-phosphonium salt of the general formula $$(RCHOH)_4 \overset{\oplus}{P} \cdot \overset{\ominus}{X}$$

wherein X represents the anion of a mineral acid, and R is a saturated, straight-chain alkyl group having 1 to 18 carbon atoms, which comprises establishing a solution of a mineral acid, an inert organic solvent, and water, admixing therewith phosphine, and introducing into the resulting mixture an aldehyde of the formula RCHO, wherein R is the same as above, the phosphine reactant being maintained in at least stoichiometric amount throughout the reaction, basis the aldehyde reactant, by introducing into the reaction mixture additional phosphine as needed, and recovering the resulting tetrakis(1-hydroxyalkyl)phosphonium salt.

References Cited in the file of this patent

UNITED STATES PATENTS 2,743,299   Flynn et al. _____ Apr. 24, 1956

OTHER REFERENCES

Reeves et al.: "J. Am. Chem. Soc.," vol. 77, pages 3923–4 (1955).